Aug. 9, 1938.  B. J. KLEERUP  2,126,474
FRAMING MECHANISM
Filed Oct. 10, 1936    2 Sheets-Sheet 1
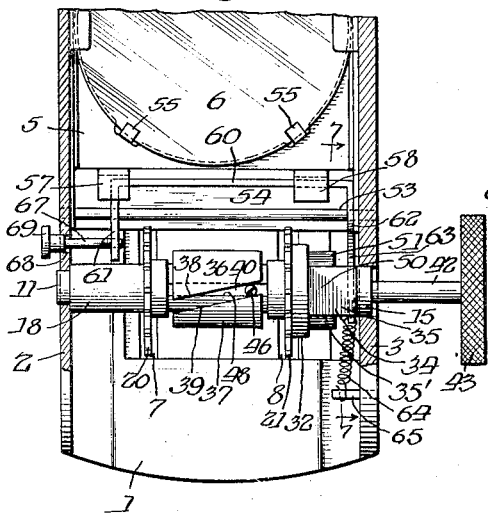
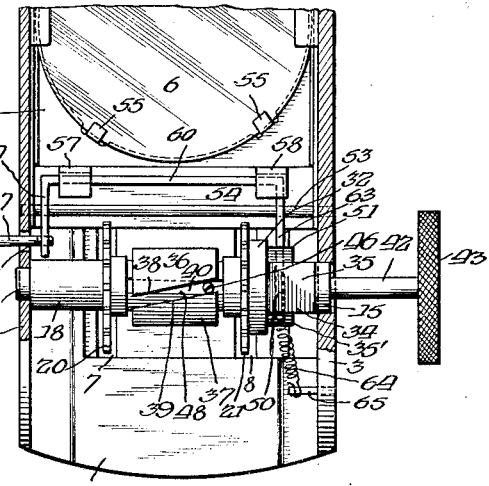
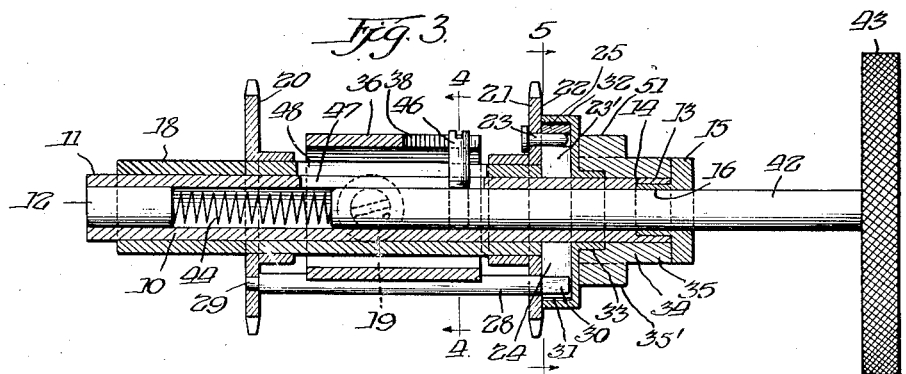
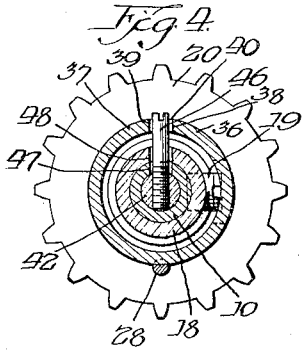
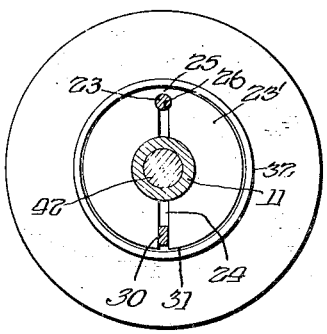
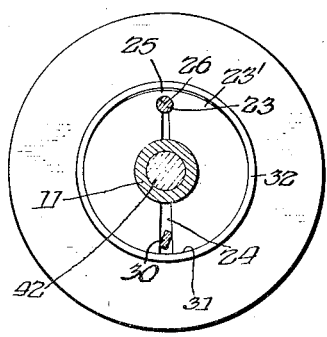
Inventor:
Bertel J. Kleerup
By Paul Carpenter
Atty

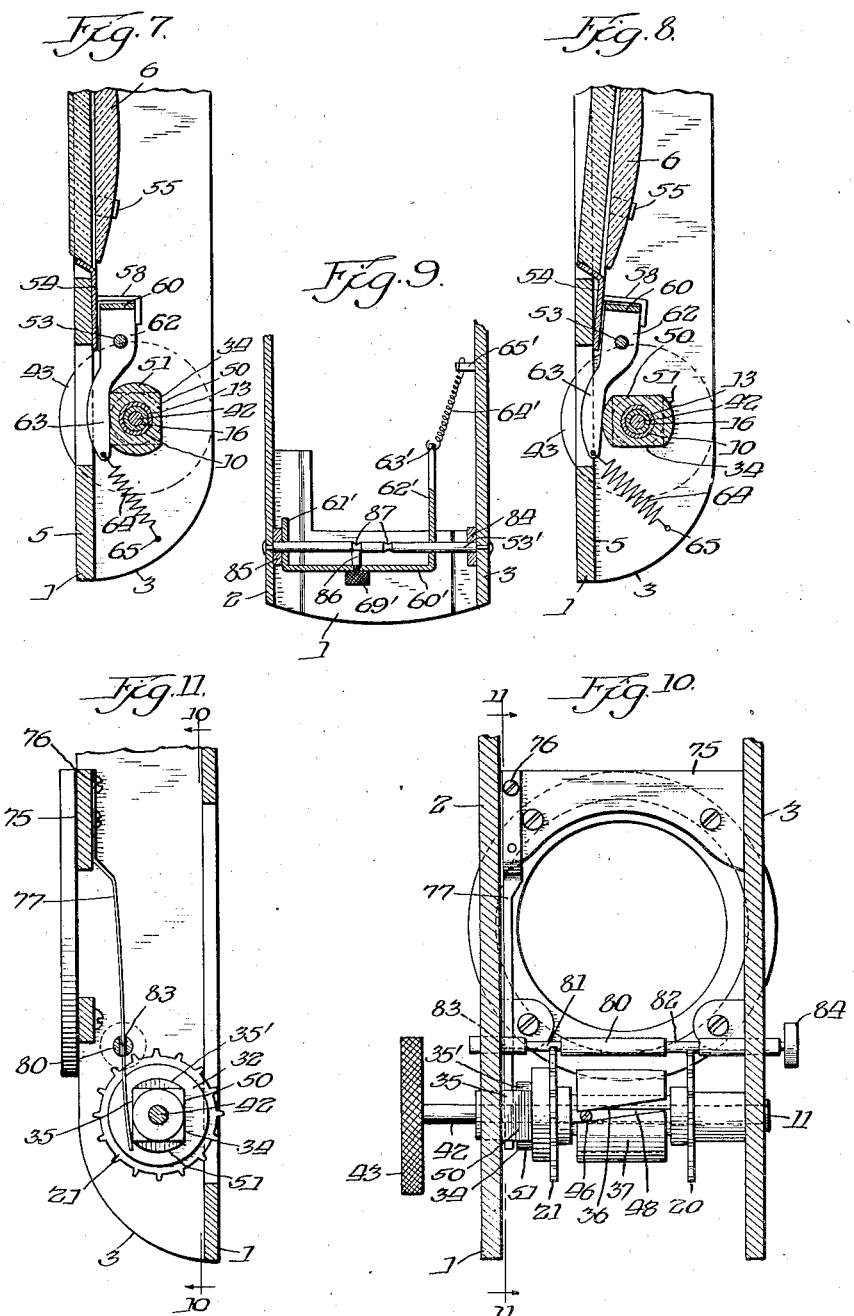

Patented Aug. 9, 1938

2,126,474

UNITED STATES PATENT OFFICE 2,126,474

FRAMING MECHANISM

Bertel J. Kleerup, Chicago, Ill., assignor to Society for Visual Education, Inc., Chicago, Ill., a corporation of Delaware Application October 10, 1936, Serial No. 105,078

13 Claims. (Cl. 88—28)

This invention relates to a film feeding means for projectors and more particularly to means for controlling film travel and film framing in such devices. In projectors it is necessary to provide means for accurately framing the film, that is, means for changing the normally fixed relationship between the film feeding means and the position at which the film is stopped for projection. While the invention hereinafter described is disclosed in connection with a projector for still pictures, it is to be understood, of course, that this invention is not restricted to such projectors but is equally applicable to the moving picture type of device. In fact, this invention is not even restricted to projectors and may be equally well applied to cameras employing a long length of film, or any other device wherein a continuous band of material is fed, and wherein the position of predetermined portions of such band of material with relation to some fixed object is important.

As applied to cameras and projection devices, it is customary to have a sprocket feed engaging a series of perforations on each side of the film. The film itself, if used for projection, has a series of regularly spaced pictures or frames, which must be accurately positioned in the projection aperture of the optical system whether single or double frame projection is desired. At the beginning of this cycle of operations, it is necessary to adjust the relative position of the film with reference to the feeding means and projection aperture and it is essential that this same position be maintained during the operation on the entire film.

It frequently happens that in a long film this relationship initially established may be destroyed because of irregularities in the film or projection device or both, in which case, it is necessary to re-establish this relationship with a minimum of time and effort.

Furthermore, in projection machines, particularly of the still picture type as used in lectures and educational work, there are in everyday use two different sizes of frames, both on standard size film. In one case, the single frame such as used in moving pictures is used so that upon the advance of one frame, the entire optical system is put into position for projecting a frame. In the other type, the unit or picture is the size of two normal frames so that the film must be advanced double the distance to project one complete image. Prior to my invention it was necessary to have two different projectors, one for each type but my invention herein makes this expensive waste unnecessary.

Inasmuch as projection machines for use in lecture halls and schools may frequently be manipulated by inexperienced persons, it is desirable that the framing and adjustment of film travel from the single frame type to the double frame type be accomplished with a minimum of trouble and apparatus. In particular, it is desirable that the framing of the pictures be accomplished in such a manner that upon the completion of the framing adjustment, the adjustment be maintained without disturbance upon the return of the film feed to the synchronized position for projection.

In apparatus of the prior art, it has frequently occurred that upon a framing adjustment being made by the operator, the apparatus is thrown out of the adjustment upon the change from a framing adjustment to the ordinary film driving position. Thus, certain apparatus of this type have had spring biased handles, which, when disposed in one position, release the film sprocket feed from the framing mechanism and permit alignment of the film. Upon such alignment and the return of the spring biased means, it frequently occurs that because of the uneven action of the mechanism, a displacement of the film occurs. Consequently, with apparatus of this type, several adjustments may be necessary before satisfactory framing is effected.

An object of this invention is to devise a film feed, which may be thrown into engagement to secure proper framing and released without accidental or uncontrollable disturbance of the film position.

A further object of this invention is to devise a mechanism for carrying out the above objects in a simple manner, said mechanism to be cheap, easily assembled, having but few parts, requiring no fine machine work and susceptible to convenient and precise manipulation.

An additional object is to devise a means for readily changing the amount of film fed by the successive projections to take care of single or double frames.

A further object is to devise a mechanism of this character, which will be simple and may be readily changed from one position to another by any inexperienced operator.

Other and additional objects are to provide a mechanism for a projection machine for accomplishing the above objects whether severally or jointly by simple mechanism susceptible to quantity production at moderate prices and such further objects, advantages and capabilities as will later more fully appear and as are inherently possessed thereby.

The invention further resides in the combination, construction and arrangement of parts illustrated in the accompanying two sheets of drawings, and while there is shown therein a preferred embodiment, it is to be understood that the same is capable of modification and change and comprehends other details and constructions without departing from the spirit of the invention.

Referring to the drawings:

Figure 1 is a fragmentary rear view of a projector sectioned vertically in front of the housing for the source of light and exposing the improved feed and with the film travel adjustment in a single frame position.

Figure 2 is an exactly similar view to Figure 1, with the film travel adjustment changed for a double frame unit.

Figure 3 is a vertical section of the film feeding means.

Figure 4 is a transverse section along line 4—4 of Figure 3 looking in the direction of the arrows.

Figure 5 is a transverse section along line 5—5 of Figure 3 looking in the direction of the arrows.

Figure 6 is a view similar to Figure 5, showing the clutch in a disengaged position.

Figure 7 is a vertical section along line 7—7 of Figure 1 looking in the direction of the arrows.

Figure 8 is a similar view to Figure 7, with the adjustment shown in Figure 2, and with the film sprocket advanced 90°.

Figure 9 is a selected view showing an alternative form of a control for single or double framing.

Figure 10 is a view along line 10—10, Figure 11, showing a modified form of construction.

Figure 11 is a view along line 11—11 of Figure 10.

Referring to the drawings, a housing 1 is provided with sides 2 and 3. A portion of the housing 1 is cut away between the sides to form a film track 5, over which film is passed and wherein a movable lens system 6 is located. In the film track 5 a pair of spaced slots 7 and 8 are provided, at which points the film is engaged by the mechanism hereinafter described.

An elongated sleeve 10 has an end 11 filled by a plug 12, while the other end 13 has the inside thereof cut out to form a shoulder 14. Disposed within the cut-out portion of end 13 is an end thrust cap 15, having a thin cylindrical lip 16 set into the reduced end 13 against shoulder 14 with the inside surface flush with the inside of sleeve 10. The entire feed is supported by end 11, journaled in side 2 of the housing and plug 15 journaled in side 3 of the housing.

Disposed around sleeve 10 is a tubular member 18 of shorter length than sleeve 10. Preferably one end of tube 18 abuts against side 2 of the housing and acts as a transverse stop. Tube 18 is locked to sleeve 10 by means of a set screw 19.

Rigidly mounted on tube 18 at spaced positions are a pair of sprockets 20 and 21. Sprocket 21 has its outer face 22 smooth and carries a pin 23, projecting outwardly from face 22. Disposed against the smooth outer face 22 of sprocket 21 is a spring disc 23', provided with an almost full diametral channel 24 leaving a bridge 25 to join the two portions of the disc. Channel 24 is enlarged at the center thereof to clear sleeve 10—tube 18 terminating flush with the smooth outer surface of sprocket 21. The end 26 of channel 24 adjacent bridge 25 is rounded to accommodate pin 23.

Diametrically opposite pin 23 is a rock shaft 28, having one end 29 reduced and journaled in sprocket 20, while the other end 30 is flattened to a generally wedge shape as shown in Figures 5 and 6. Rock shaft 28 passes through sprocket 21 with the wedge part 30 projecting outwardly from face 22 of the sprocket for substantially the same distance as pin 23. Wedge part 30 of the rock shaft sets into channel 24 near the open end thereof, and as evident in Figures 5 and 6, is adapted to spread apart the two parts of disc 23' when twisted. The outer peripheral surface 31 of the disc 23' is finished off smooth and in the contracted position is adapted to clear a drum 32 surrounding said disc. In the expanded position, as shown in Figure 5, the disc 23' tightly grips the inside surface of drum 32. Drum 32 has a reduced collar portion 33, upon which is forced a cam 34 to be described in detail later herein.

Rigidly carried by rock shaft 28 are two jaws 36 and 37 preferably integral and formed out of a cylindrical member. Jaws 36 and 37 enclose tube 18 and on the side of said tube opposite said rock shaft terminate in pitched surfaces 38 and 39, defining a pitched channel 40. It is clear that by the rocking of jaws 36 and 37 that rock shaft 28 will be actuated to control the spring clutch disc 23'.

In order to rock jaws 36 and 37, a rod 42 is fitted into the bore of sleeve 11. This rod carries a knurled knob 43 at one end and at the inside end abuts against a coil spring 44. This coil spring tends to keep rod 42 in its outermost position. Carried by rod 42 is a pin 46 screwed in and extending radially outwardly therefrom. This pin is so disposed that in normal outward position of rod 42, as shown in Figure 3, pin 46 is at one end of channel 40 into which said pin projects. Straight clearance slots 47 and 48 are cut in sleeve 11 and tube 18, through which pin 46 projects. In the assembly of the device, sleeve 11 and tube 18 are disposed so that the two slots register whereupon set screw 19 is tightened.

Upon rod 42 being pressed inwardly, pin 46 is moved axially towards sprocket 20. By virtue of the pitch of channel 40 and the lack of pitch of slots 47 and 48, pin 46 acts as a cam follower along the two surfaces 38 and 39 and forces jaws 36 and 37 to rock and turn shaft 28. It is clear that rotation of knurled knob 43 will, whatever the longitudinal position of rod 42, always turn sprockets 20 and 21 because of pin 46 just clearing the straight slots 47 and 48 in members 11 and 18. However, in one position of rod 42, drum 32 will turn with sprockets 20 and 21, while in another position of rod 42, drum 32 will be disengaged and be free of the sprocket feed. In the normal operation of the device, it is preferred to have the engaged position when rod 42 is out. However, this may easily be reversed by reversing the pitch of channel 40.

Thus it will be seen that the framing is accomplished by pushing in the knurled knob 43 which, by movement of the pin 46 carried thereon, rocks and turns the shaft 28 releasing the squeeze on the spring disc 23' and so permits free adjustment. When framing is secured, the knob is manually released and the spring 44 returns the shaft with knob 43 to normal operating position. This avoids the difficulty of the picture getting out of frame when manual pushing or pulling of the knob is required. This description demonstrates that, when the framing, either single or double, is accomplished, nothing further is required except manual releasing of the knob 43 which returns at once to film advancing position without jarring the mechanism or throwing out the framing.

Cam 34 is divided into two transverse portions 35 and 35'. Part 35 of the cam is preferably a square cross-section. Part 35' of the cam preferably has two opposite sides 50 flush with the corresponding sides of part 35, as shown in Figures 1 and 2. The other two sides of part 35' are provided with segments 51 extending those sides to the surfaces of the enclosing cylinder.

Pivotally mounted on a pin 53 in sides 2 and 3 of the frame and above the film drive and parallel to the axis thereof is a bracket 54, having a plurality of tabs 55 formed therein and supporting lens 6. Spaced above 53, a pair of ears 57 and 58 are carried by bracket 54 at the rear thereof. Slidably mounted in these ears is a rod 60 having depending arms 61 and 62. Rod 60 is adapted to rock bracket 54 on its pin 53 and in order to accomplish this, arm 62 has the end thereof 63 bearing against cam 34, being spring pressed by a spring 64 anchored at 65 to the frame. Arm 61 carries a rod 67 projecting therefrom through an aperture 68 in side 2 of the frame. A knob 69 on rod 67 permits of the manual adjustment of rod 60 transversely of the projector. As shown in Figure 1, with knob 69 pushed in, cam rider 63 is on the outer portion 35 of the cam. In the position shown in Figure 2, with knob 69 out, cam rider 63 is on portion 36 of the cam. Obviously, in the position shown in Figure 1, the lens system 6 will be positioned for projection every one-quarter turn of knob 43, whereas in Figure 2, the adjustment provides for twice the film feed before projection.

It is well known that an operator working in the darkness or semi-darkness of projecting depends a great deal upon his sense of touch as well as the sense of hearing. In providing mechanism for controlling the amount of film advanced, i. e., for single or for double frame projection, I have provided an alternative form shown in Figure 9, which caters to the operator's sense of hearing as well as his sense of touch. This mechanism is mounted on a rod or pin 53' which is secured to sides 2 and 3 of the frame below the film drive and parallel with the axis thereof. Adjacent the sides 2 and 3 and at the ends of the rod 53' are stops or spacer washers 84 and 85. Slidably mounted on rod or pin 53' is a rod 60' having upstanding arms 61' and 62'. Arm 62' has its end 63' bearing against cam 34, the requisite tension being supplied by spring 64' anchored at 65' to the frame. The position shown in Figure 9 is for double framing. For single framing the rod 60' is manually moved toward and against the stop 84, at which point the pin 86 which is rigidly secured to knurled knob 69' on rod 60' will engage a peripheral depression 87, one of two, in the rod 53', and the movement of this pin into this slight depression will cause a metallic click which will be audible to the operator and indicate that the film movement control is secure.

In Figures 10 and 11, modified framing mechanism is shown. A lens frame 75 has anchored thereto at 76 a spring 77, whose free end rides on cam 34. An adjustment rod 80, having reduced portions 81 and 82 to clear sprockets 20 and 21, is slotted at 83, through which slot spring 77 passes. Rod 80 is journaled in sides 2 and 3 of the projector frame, said rod being transversely movable in said frame by means of a knob 84. Slot 83 in rod 80 is just wide enough so that as rod 80 is moved back and forth, spring 77 is turned on its pivot fastening 76 to permit the free end of the spring to ride over the proper portion of the cam.

I claim:

1. In a device of the type described, mechanism adapted to project single and double frame film comprising a housing, a rotatable driving member mounted within said housing, film advancing means on said driving member, a clutch associated with said film advancing means normally retaining said means in driving position and adapted to release said means for framing, a cam associated with said driving member comprising a portion adapted to advance said film advancing means in single frame stages, and a portion adapted to advance said film advancing means in double frame stages, and a cam follower slidably mounted in said housing to engage either portion of said cam.

2. In film projecting device, a housing, a shaft rotatably mounted in said housing, film advancing means on said shaft, a clutch mechanism associated with said film advancing means normally retaining said means in driving position and adapted to release said means for framing, a cam associated with said shaft adapted to advance said film advancing means in single frame stages, a second cam adapted to advance said film advancing means in double frame stages, a cam rider slidably mounted in said housing to engage either of said cams, and means controlled by said cam rider to actuate said film advancing means in timed relation with the optical system.

3. In a device of the class described, a device for framing and advancing films comprising film supporting means, a rotatable driving member, film advancing sprockets on said driving member, a split disc member coupled to one of said sprockets, a rock shaft positioned substantially parallel to said driving member provided with a wedge adapted to expand said disc member, jaws mounted on said rock shaft, manually operable means adapted to change the lateral position of said jaws to rock the shaft, and a drum enclosing said disc member and adapted to be gripped thereby in the expanded position of said disc member.

4. In a device of the class described, a device for framing films comprising a housing, a driving member rotatably mounted within said housing, film feeding members on said driving member, a split spring member secured to one of said feeding members, a rock shaft journaled in said film feeding members having a portion adapted to spread said spring member upon rocking, a pair of jaws secured to said rock shaft surrounding said driving member and terminating in pitched surfaces, a manually operable member disposed within said driving member and extending outwardly thereof adapted to rotate said driving member, a pin carried by said manually operable member adapted to engage said pitched surfaces upon axial movement thereof to rock said shaft, and a drum encircling said spring member and adapted to be gripped thereby upon spreading of said member.

5. In a device adapted to project single and double frame films, a housing, a driving member rotatably mounted in said housing, film advancing means on said driving member, a cam associated with said film advancing means having surfaces adapted to advance said means in single frame stages, a second cam associated with said film advancing means having surfaces adapted to advance said means in double frame stages, a rod slidably mounted in said housing, and a cam rider depending from said rod adapted to yieldingly engage either of said cams and to adjust said film advancing means in timed relation.

6. In a device of the type described, a device for framing single and double frame films comprising a housing, a shaft disposed within said housing, film advancing members mounted on said shaft, a cam releasably associated with said film advancing members comprising a substantially square cross section portion and a complementary portion having two opposed flat surfaces and two opposed rounded surfaces, a rod slidably mounted in said housing provided with depending arms, a bracket pivotally resting on said rod, means depending from one of said arms for sliding said rod, and a spring positioned cam rider depending from the other arm adapted to engage either portion of said cam.

7. In a device of the type described, a device for framing single and double frame films comprising a frame, film advancing means within said frame, a cam releasably associated with said film advancing means adapted to advance said means in single frame stages, a second cam associated with said film advancing means adapted to advance said means in double frame stages, a bar horizontally disposed within said frame having a pair of spaced notches, a rod slidably mounted on said bar terminating in a cam rider adapted to yieldingly engage either of said cams, and a pin member carried by said rod positioned to engage one of said notches when said cam rider is engaged with the first cam and the other of said notches when said cam rider is in engagement with said second cam.

8. In a device of the type described, a device for framing single and double frame films comprising a housing, film advancing members disposed within said housing, a shaft rotatably mounted in said housing to drive said members, a cam associated with said film advancing members adapted to advance said members in single frame stages, a second cam associated with said members adapted to advance said members in double frame stages, a spring member pivotally mounted in said housing and having a free end adapted to releasably engage either of said cams, a rod slidably mounted in said housing transversely to said spring member and having a slotted portion adapted to house said spring member, and manually operable means for sliding said rod to change the engagement of the free end of said spring member.

9. In a film projecting device, a frame, a hollow driving member journalled in said frame, film advancing members rigidly mounted on said driving member, a split disc member coupled to one of said film advancing members, a rock shaft journalled in said film advancing members, a wedge portion on said rock shaft entering the split in said disc member and adapted to expand said disc member upon oscillation of said shaft, a jaw rigidly mounted on said rock shaft and terminating in a pitched surface, a rod disposed within said driving member extending outwardly therefrom and movable longitudinally thereto, a pin carried by said rod adapted to engage said pitched surface upon longitudinal movement of said rod to rock said shaft, a driven drum-shaped member enclosing said disc member adapted to grip said member in its expanded position, and spring means within said hollow driving member yieldingly urging said rod outwardly.

10. In a device of the class described, a frame, a hollow driving member rotatably journalled in said frame, film advancing members rigidly mounted on said driving member, a split disc coupled to one of said film advancing members, a rock shaft rotatably journalled in said film advancing members having a wedge-shaped member extending into the split of said disc, a pair of jaws rigidly mounted on said rock shaft encircling said tube and forming a channel pitched in respect to the axis of said rock shaft, a rod disposed within said hollow driving member and extending outwardly therefrom and movable longitudinally in respect thereto, a pin carried by said rod extending through said driving member into said pitched channel and adapted to oscillate said jaws upon longitudinal movement thereof, a drum enclosing said disc member and adapted to be gripped thereby in the expanded position of said disc member, and cam means operated by said drum for adjusting said film advancing members in timed relation.

11. In mechanism adapted to project single and double frame film comprising a housing, a rotatable driving member mounted within said housing, film advancing means on said driving member, a clutch associated with said film advancing means normally retaining said means in driving position and adapted to release said means for framing, and means associated with said driving member including a pair of cams, one of said cams being adapted to advance said film advancing means in single frame stages and the other of said cams being adapted to advance said means in double frame stages, and a manually controlled cam follower adapted to selectively engage either of said cams.

12. A device of the class described for framing and advancing film comprising film supporting means, a rotatable driving member, a film advancing means on said driving member, a split disk member coupled to said film advancing means, a rock shaft positioned substantially parallel to said driving member and provided with means adapted to expand said disk member, projecting members fixedly carried on said rock shaft, manually operable means adapted to change the lateral position of said projecting members to rock said shaft, and a drum enclosing said disk member and adapted to be gripped thereby in the expanded position of said disk member.

13. In a film projecting device, a device for framing films comprising a housing, film supporting means within said housing, a shaft rotatably mounted within said housing, film advancing means mounted on said shaft, a driven member releasably carried on said shaft to control said film advancing means, a clutch carried on said shaft normally securing said driven member to said shaft, a second shaft mounted coaxially with and adapted to rotate said first mentioned shaft, said second shaft having a finger piece thereon outside of said housing, a spring member pressing against said second shaft and urging said finger piece away from said housing, and means carried on said second shaft adapted to engage said clutch and release said driven member for framing when said second shaft is pressed inwardly.

BERTEL J. KLEERUP.